United States Patent [19]

Hayano

[11] Patent Number: 4,903,259

[45] Date of Patent: Feb. 20, 1990

[54] TIME-DIVISION MULTIPLEX SWITCHING NETWORK

[75] Inventor: Shin-Ichiro Hayano, Tokyo, Japan

[73] Assignee: NEC Corporation, Japan

[21] Appl. No.: 222,259

[22] Filed: Jul. 21, 1988

[30] Foreign Application Priority Data

Jul. 24, 1987 [JP] Japan ................................. 62-183508
Jul. 24, 1987 [JP] Japan ................................. 62-183509
Jul. 24, 1987 [JP] Japan ................................. 62-183510

[51] Int. Cl.$^4$ ........................................... H04Q 11/04
[52] U.S. Cl. ...................................... 370/58.3; 370/16
[58] Field of Search ..................... 370/68, 66, 16, 58

[56] References Cited

U.S. PATENT DOCUMENTS 4,543,652 9/1985 Amada et al. ......................... 370/66
4,633,460 12/1986 Suzuki et al. .......................... 370/58

OTHER PUBLICATIONS

Paper No. 1842 read in Japan by the inventor on the General Meeting Celebrating the 70th Anniversary of founding of Electronics and Communication Institute of Japan (Mar. 1987), published on Mar. 15, 1987 and entitled "A Space Switch Configuration for a Broadband Time-Division Switching System", which corresponds to the U.S. patent application No. 101,859.

Primary Examiner—Robert L. Griffin
Assistant Examiner—Wellington Chin
Attorney, Agent, or Firm—Ostrolenk, Faber, Gerb & Soffen.

[57] ABSTRACT

A switching network is constituted by a plurality of time switches which are arranged in a matrix and at cross points between a plurality of input buses and a plurality of output buses, on which frame synchronization signals are multiplexed. Each time switch includes a data memory in which data on the input bus is written in synchronism with the frame synchronization signal included in the input bus, and from which data is read out under the address control of a control memory in synchronization with the frame synchronization signal included in the output bus.

7 Claims, 6 Drawing Sheets

TIME-DIVISION MULTIPLEX SWITCHING NETWORK

BACKGROUND OF THE INVENTION

The present invention relates to a time-division multiplexed switching network in a time-division broadband exchanger.

In a time-division broadband exchanger using signals having frequencies of several hundred of MHz or higher, signal delays in the wiring pose a problem. In order to solve this problem, it is known to use a frame synchronization technique. An arrangement of the conventional time-division broadband exchanger is described in U.S. patent application Ser. No. 101,759 filed on Sept. 28, 1987.

In the conventional time-division broadband exchanger, in order to solve the problem of signal delays in the wiring, a frame synchronization signal generator adds a frame synchronization signal to data signals on an input bus. The exchanger is constituted by a plurality of input buses, a plurality of output buses, a space switch arranged between the input buses and the output buses for performing signal exchange between the input and output buses, frame synchronization signal generators for providing the corresponding input buses with frame synchronization signals, respectively, a plurality of multiplexers connected in series with each of the input buses for multiplexing the data signals and the frame synchronization signal, respectively, a plurality of demultiplexers connected in series with each of the output buses for demultiplexing signals on the output buses, respectively, a control memory for controlling the space switch, and a plurality of phase difference detectors arranged at the input terminal of the space switch. The phase difference detector controls an output frame phase of the frame synchronization signal generator so that the frame phase of each input bus is aligned with the reference phase of the space switch. In this manner, the entire switching network can be synchronously operated while compensating for signal delays.

However, since this exchanger is constituted by the multiplexers, demultiplexers and the space switch, exchange of the data signals multiplexed on the buses on the time base cannot be performed. Therefore, when multiple stages of exchangers are to be connected, the probability of blocking of the space switches is increased. This makes it difficult to constitute a large-capacity exchanger.

SUMMARY OF THE INVENTION

It is an object of the present invention to provide a time-division multiplexed switching network which can eliminate the conventional drawbacks and can constitute a large-capacity exchanger which serves as both a time switch and a space switch while automatically absorbing signal delays in the wiring.

A time-division multiplexed switching network according to the present invention comprises: a plurality of stages of switch groups connected to each other through a plurality of buses; each of the switch groups being constituted by connecting a plurality of basic switches each of which is constituted by a plurality of input buses and a plurality of output buses crossing each other, a plurality of time switches arranged at crosspoints of the input buses and the output buses, and a plurality of circuits for providing frame synchronization data to a time-division multiplexed signal on each of the input and output buses, wherein each of the time switches has a data memory, a data input of which is connected to the input bus and a data output of which is connected to the output bus, means for detecting a frame phase in accordance with the frame synchronization data provided to the time-division multiplexed signal on the input bus, aligning the detected frame phase with a frame phase of first control data, and writing a data signal on the input bus at an address of the data memory indicated by the first control data, and means for detecting a frame phase in accordance with the frame synchronization data provided to the time-division multiplexed signal on the output bus, aligning the detected frame phase with a frame phase of second control data, reading out the data signal from an address of the data memory indicated by the second control data and outputting the readout data onto the output bus.

DETAILED DESCRIPTION OF THE PREFERRED EMBODIMENTS

Embodiments of the present invention will be described below with reference to the accompanying drawings.

Figure 1:
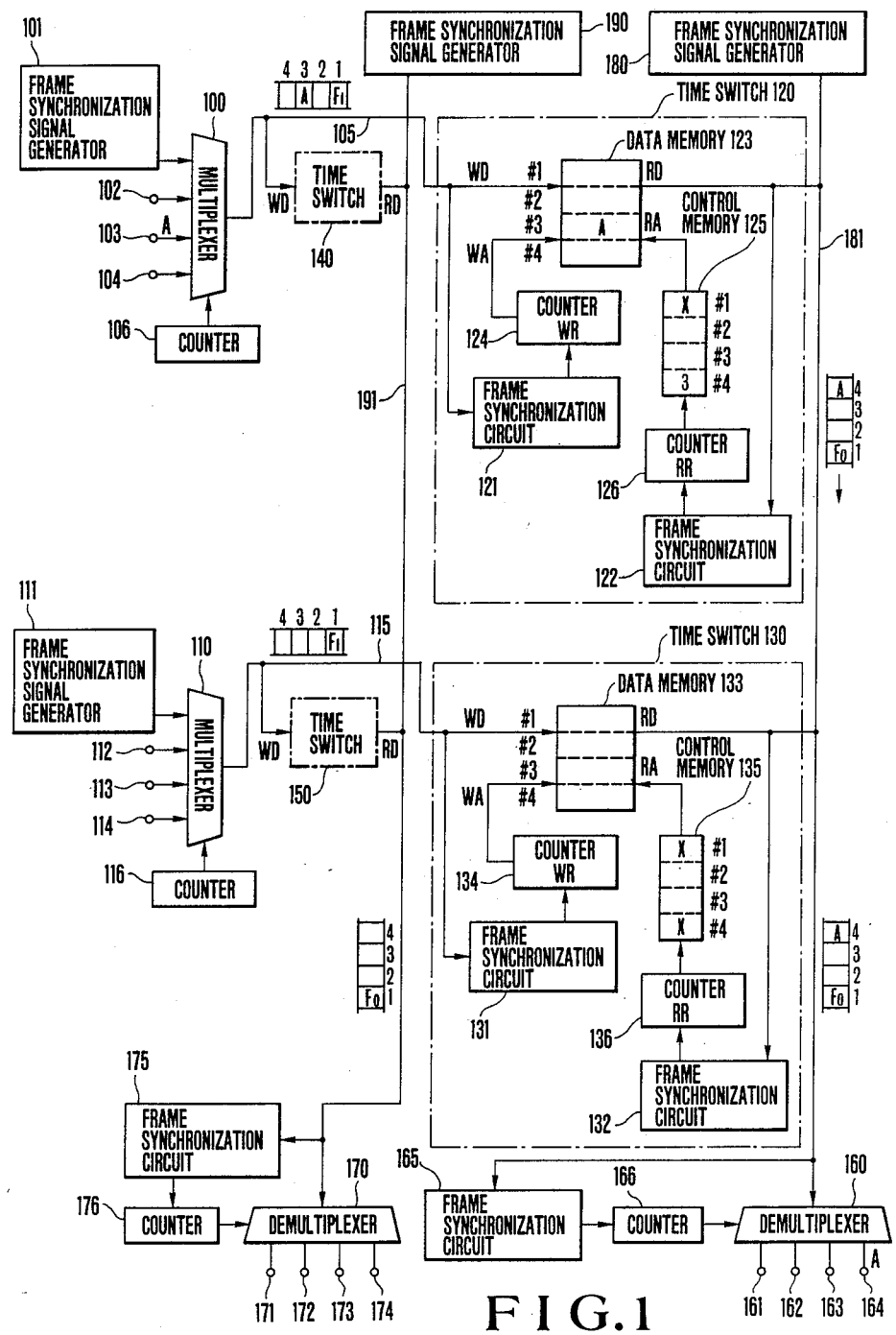
FIG. 1 is a block diagram showing an arrangement according to an embodiment of the present invention.

FIG. 1 is a block diagram showing a first embodiment of the present invention. The embodiment shown in FIG. 1 exemplifies a basic switch consisting of two input buses and two output buses.

In FIG. 1, time switches 120, 130, 140, and 150 are arranged at four cross points between input buses 105 and 115 and output buses 181 and 191. Illustration of the internal circuits of the time switches 140 and 150 is omitted in FIG. 1.

Four signals, i.e., three data signals and one frame synchronization signal are multiplexed on each of the input buses 105 and 115 and the output buses 181 and 191.

The arrangement will be described below. A multiplexer 100 multiplexes a frame synchronization signal $F_I$ output from a frame synchronization signal generator 101 and data signals input at input terminals 102, 103, and 104 under the control of the output of a counter 106, and outputs the multiplexed signal onto the input bus 105.

A multiplexer 110 multiplexes a frame synchronization signal $F_I$ output from a frame synchronization signal generator 111 and data signals input at input terminals 112, 113, and 114 under the control of the output of a counter 116, and outputs the multiplexed signal onto the input bus 115. In each of the input buses 105 and 115, the frame synchronization signal $F_I$ is assigned to a first time slot.

The input bus 105 is connected to the input terminals of the time switches 120 and 140, and the input bus 115 is connected to the input terminals of the time switches 130 and 150.

The output terminals of the time switches 120 and 130 are connected to the output bus 181, and the output terminals of the time switches 140 and 150 are connected to the output bus 191.

One end of the output bus 181 is connected to a frame synchronization signal generator 180 for generating a frame synchronization signal $F_O$, and the other end thereof is connected to input terminals of a frame synchronization circuit 165 and a demultiplexer 160. The frame synchronization circuit 165 detects the frame synchronization signal $F_O$ on the output bus 181, and resets a counter 166. The demultiplexer 160 demultiplexes an input signal under the control of the output signal from the counter 166, and outputs the frame synchronization signal $F_O$ from an output terminal 161 and data signals from output terminals 162, 163, and 164.

One end of the output bus 191 is connected to the output terminal of a frame synchronization signal generator 190 for outputting the frame synchronization signal $F_O$, and the other end thereof is connected to the input terminals of a frame synchronization circuit 175 and a demultiplexer 170. The output terminal of the frame synchronization circuit 175 is connected to the input terminal of a counter 176. The frame synchronization circuit 175 detects the frame synchronization signal $F_O$ on the output bus 191, and resets the counter 176. The demultiplexer 170 demultiplexes an input signal under the control of the output signal from the counter 176, and outputs the frame synchronization signal from an output terminal 171 and data signals from output terminals 172, 173, and 174.

In time switch 120, the input terminal thereof is connected to a write data terminal WD of a data memory 123 and the input terminal of a frame synchronization circuit 121. The output terminal of the time switch 120 connected to the output bus 181 is connected to a read data terminal RD of the data memory 123 and the input terminal of a frame synchronization circuit 122.

The output terminal of the frame synchronization circuit 121 is connected to a reset terminal WR of a counter 124. The frame synchronization circuit 121 detects the frame synchronization signal $F_I$ on the input bus 105, and resets the counter 124. The output terminal of the counter 124 is connected to a write address input terminal WA of the data memory 123.

The output terminal of the frame synchronization circuit 122 is connected to a reset terminal RR of a counter 126. The frame synchronization circuit 122 detects the frame synchronization signal $F_O$ from the output bus 181, and resets the counter 126.

The output terminal of the counter 126 is connected to an address terminal of a control memory 125. The output terminal of the control memory 125 is connected to a read address terminal RA of the data memory 123.

Frame synchronization circuits 131 and 132, a data memory 133, and counters 134 and 136 of the time switch 130 have the same arrangements and functions as those of the frame synchronization circuits 121 and 122, the data memory 123, and the counters 124 and 126 of the time switch 120, and the connections between them are the same as those in the time switch 120.

The time switch 140 is the same as the time switch 120, and the time switch 150 is identical to the time switch 130.

An operation of the matrix switch shown in FIG. 1 when the input terminal 103 is connected to the output terminal 164 is described below.

The frame synchronization signal generators 101 and 111 output the frame synchronization signal $F_I$. The multiplexer 100 multiplexes the frame synchronization signal $F_I$ in a time slot 1 of the input bus 105 and a data signal A in a time slot 3 thereof in accordance with the output from the counter 106.

The multiplexer 110 multiplexes the frame synchronization signal $F_I$ in a time slot 1 of the input bus 115 in accordance with the output from the counter 116. The frame synchronization circuit 121 of the time switch 120 resets the counter 124 at the time slot position of the frame synchronization signal $F_I$ multiplexed on the bus 105. Thus, since the frame phase of the input bus 105 input to the data memory 123 is aligned with the frame phase of the write address WA, the counter 124 outputs "3" using a time slot 3, and the data signal A is written at an address #3 of the data memory 123. Similarly, the data signal A is written at an address #3 of the time switch 140.

Frame synchronization circuits 180 and 190 respectively output frame synchronization signals $F_O$ to the output buses 181 and 191 for every frame. A control system (not shown in FIG. 1) writes, in advance, data "3" at an address #4 of the control memory 125 of the time switch 120 and a read inhibition code X at an address #1 thereof, and writes the read inhibition code X at addresses #1 and #4 of a control memory 135 of the time switch 130.

The frame synchronization circuit 122 of the time switch 120 detects the frame phase on the output bus 181 in accordance with the frame synchronization signal $F_O$, and resets the counter 126 in the time slot in which the frame synchronization signal $F_O$ is multiplexed. Thus, the frame phase of a control signal input to the data memory 123 is aligned with the frame phase of the output bus 181. Thus, the control memory 125 outputs the data "3" stored at the address #4 to the read address input RA of the data memory 123 at a time slot 4 of the output bus 181. The data memory 123 outputs the data signal A onto the output bus 181. Since the control memory 125 inhibits read access of the data memory 123 at the time slot 1, the frame synchronization signal $F_O$ multiplexed on the output bus 181 will not collide with the data signals.

The frame synchronization circuit 132 of the time switch 130 detects the frame phase on the output bus 181 in accordance with the frame synchronization signal $F_O$, and resets a counter 136 at the time slot 1. Thus, the frame phase of a control signal input to the data memory 133 is aligned with the frame phase of the output bus 181. Since a control memory 135 inhibits read access of the data memory 133 at the time slots 1 and 4, the frame synchronization signal $F_O$ and the data signal A multiplexed on the output bus 181 will not collide with other data signals.

The frame synchronization circuit 165 detects the frame phase on the output highway 181 using the frame synchronization signal $F_O$, and resets the counter 166 at the time slot in which the frame synchronization signal $F_O$ is multiplexed. Thus, the phase of the control signal input to the demultiplexer 160 is aligned with the frame phase of the output bus 181. The demultiplexer 160 outputs the data signal A multiplexed in the time slot of the output bus 181 to the output terminal 164.

Since the data signal A is also written at an address #3 of a data memory of the time switch 140, the data signal A can be output to the output terminals 171 to 174 of the demultiplexer 170. That is, the basic switch shown in FIG. 1 serves as a 6×6 matrix switch.

As described above, according to this embodiment, the frame synchronization signals $F_I$ are provided to the time-division multiplexed signals on the input buses 105 and 115, the frame phases of the input buses 105 and 115 of the time switches 120 and 130 are detected, and the counters 124 and 134 are reset in synchronism with the phases of the input buses 105 and 115. The frame phases of the input buses 105 and 115 of the data memories 123 and 133 are aligned with that of the write address WA. Thus, the data signals can be written at correct addresses regardless of the signal delays due to the input buses 105 and 115.

The frame synchronization signals $F_O$ are provided to the data signals on the output buses 181 and 191, the frame phase of the output bus 181 connected to the time switches 120 and 130 is detected, and the counters 126 and 136 are reset in synchronism with the phase of the output bus 181. The frame phases of the control signals input to the data memories 123 and 133 are aligned with that of the output bus 181. Thus, the data signals can be output to the correct time slots regardless of the signal delays in the output buses 181 and 191.

The data memories 123 and 133 are operated not only simply as phase conversion switches but also as elastic storages which are interposed between the input and output buses. Thus, the data signals can be time-division exchanged between a plurality of buses regardless of the frame phase difference between the input and output buses.

In the description of this embodiment, the data memories are subjected to sequential write access and random read access. However, the data memories may be subjected to random write access and sequential read access to constitute the switching network.

Figure 2:
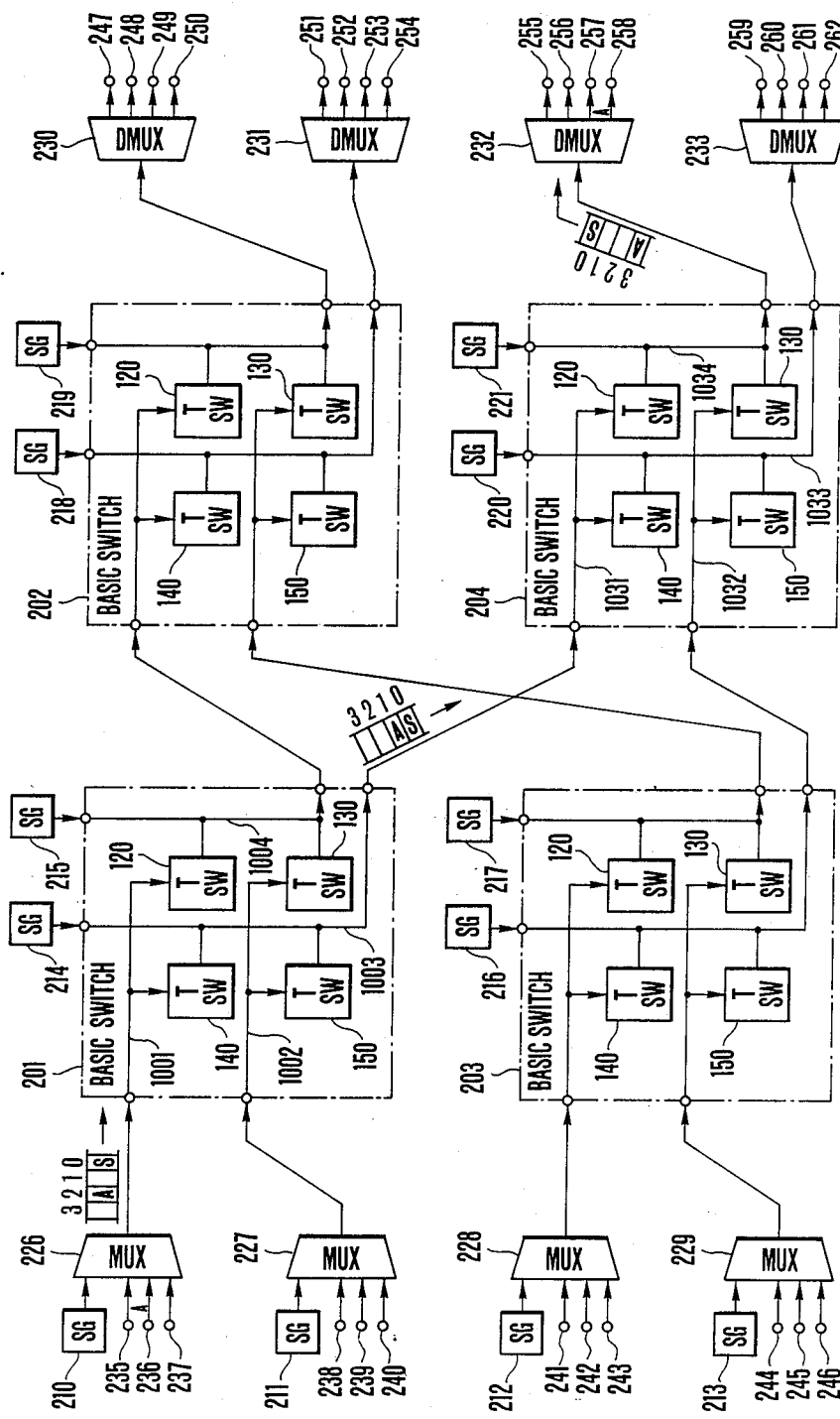
FIG. 2 is a block diagram showing an arrangement according to another embodiment of the present invention.

FIG. 2 shows another embodiment of the present invention. The same reference numerals in FIG. 2 denote the same parts as in FIG. 1. In FIG. 2, basic switches 201, 202, 203, and 204 have the same arrangement, and are arranged in a matrix. Each of the basic switches 201 to 204 has two input buses and two output buses, and time switches 120, 130, 140, and 150 having the same arrangements as those in FIG. 1 are connected at the cross points between the input and output buses in the same manner as in FIG. 1.

One end of each output bus of each of the basic switches 201 to 204 receives a frame synchronization signal S from a corresponding one of frame synchronization signal generators 214, 215, 216, 217, 218, 219, 220, and 221.

The two input buses of each of the basic switches 201 and 203 are connected to the output terminals of corresponding multiplexers 226, 227, 228, and 229 each of which multiplexes one frame synchronization signal S and three data signals.

The other end of each output bus of the basic switches 201 and 203 is connected to a corresponding one of the input buses of the basic switches 202 and 204 in one-to-one correspondence.

The two output buses of each of the basic switches 202 and 204 are connected to the input terminals of corresponding demultiplexers 230, 231, 232, and 233.

Each of the demultiplexers 230 to 233 outputs one frame synchronization signal S and three data signals.

With the above connections, a two-stage link time-division switching network can be constituted.

A case wherein a data signal A, applied to an input terminal 236, is output to an output terminal 258 in the switching network shown in FIG. 2 is described below. A frame synchronization signal generator 210 periodically generates the frame synchronization signal S. The multiplexer 226 outputs the frame synchronization signal S onto a bus 1001, and multiplexes the data signal A applied to the input terminal 236 in a time slot 2. Frame synchronization signal generators 214 and 215 periodically output frame synchronization signals S onto output buses 1003 and 1004, respectively.

Time switches 120 and 140 store the data signal A on the input bus 1001 at addresses #2 of their data memories. The time switch 140 outputs the data signal A in to a time slot 1, on the output bus 1003.

In this manner, the time-division multiplexed signal output from the bus 1003 of the basic switch 201 is applied to an input bus 1031 of the basic switch 204. Time switches 120 and 140 of the basic switch 204 store the data signal A multiplexed in the time slot 1 of the input highway 1031 at addresses #1 of their data memories. The time switch 120 of the basic switch 204 outputs the data signal A in a time slot 3 on an output bus 1034 in accordance with control data. The demultiplexed 232 demultiplexes the time-division multiplexed signal obtained on the bus 1034, and outputs the data signal A to the output terminal 258.

Figure 3:
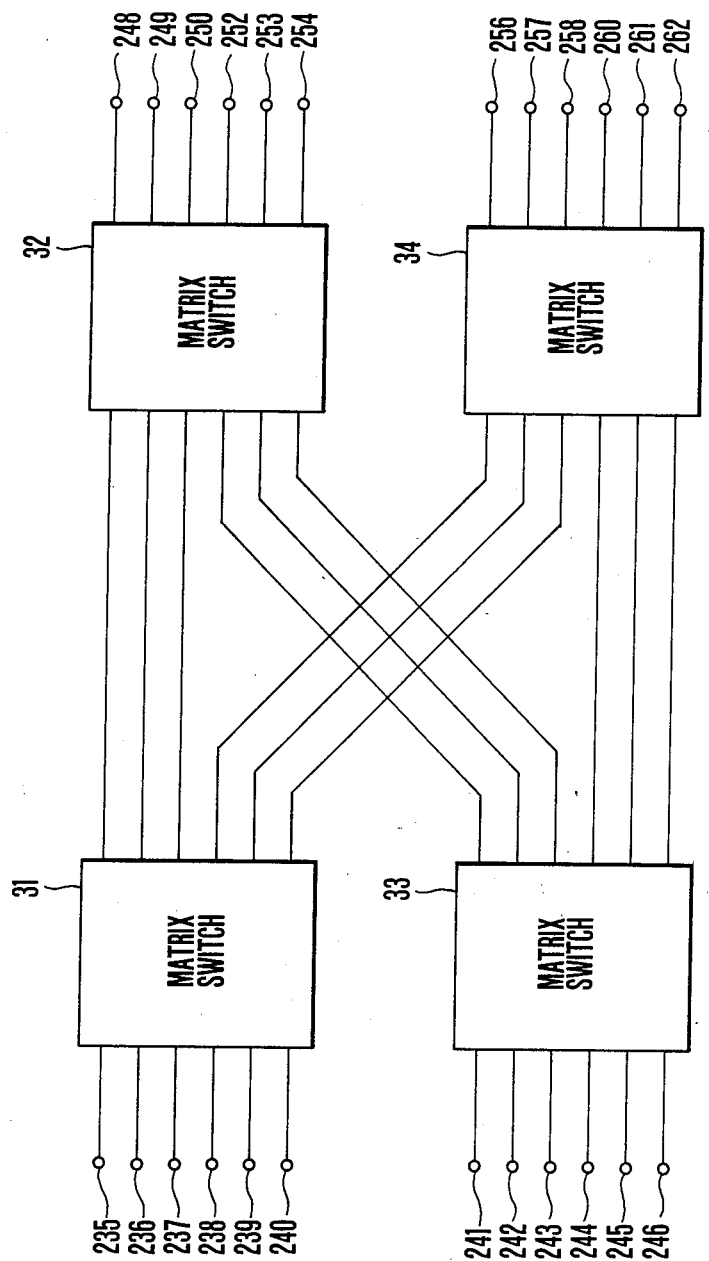
FIG. 3 is a block diagram showing an equivalent circuit of a switching network shown in FIG. 2.

FIG. 3 shows a space-division equivalent switching network of the time-division switching network shown in FIG. 2. The basic switches 201 to 204 shown in FIG. 2 can be respectively represented by 6×6 matrix switches 31, 32, 33, and 34. The space-division equivalent switching network shown in FIG. 3 has a structure in which a primary switch consisting of the matrix switches 31 and 32 and a secondary switch consisting of the matrix switches 33 and 34 are triple-link connected.

Figure 4:
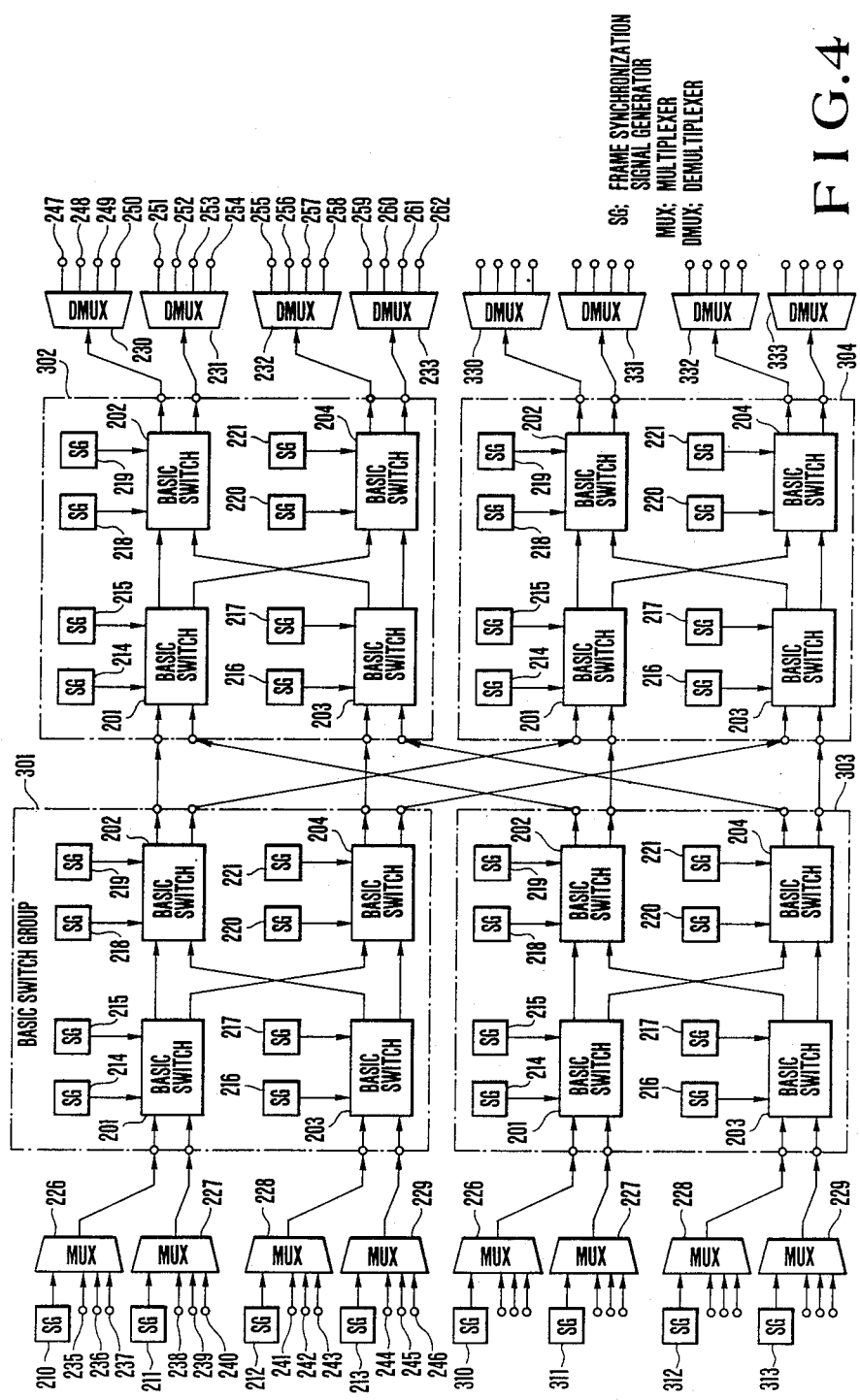
FIG. 4 is a block diagram showing an arrangement according to still another embodiment of the present invention.

FIG. 4 is a block diagram showing still another embodiment of the present invention. The same reference numerals in FIG. 4 denote the same parts as in FIG. 2. In this embodiment, in order to increase a switching capacity of the time-division switching network, a juncture time-division switching network is constituted using the 2-stage link time-division switching network in the embodiment of FIGS. 2 and 3 as a basic switch group. More specifically, a primary switch group consisting of basic switch groups 301 and 302 and a secondary switch group consisting of basic switch groups 302 and 304 are juncture-connected through buses.

Figure 5:
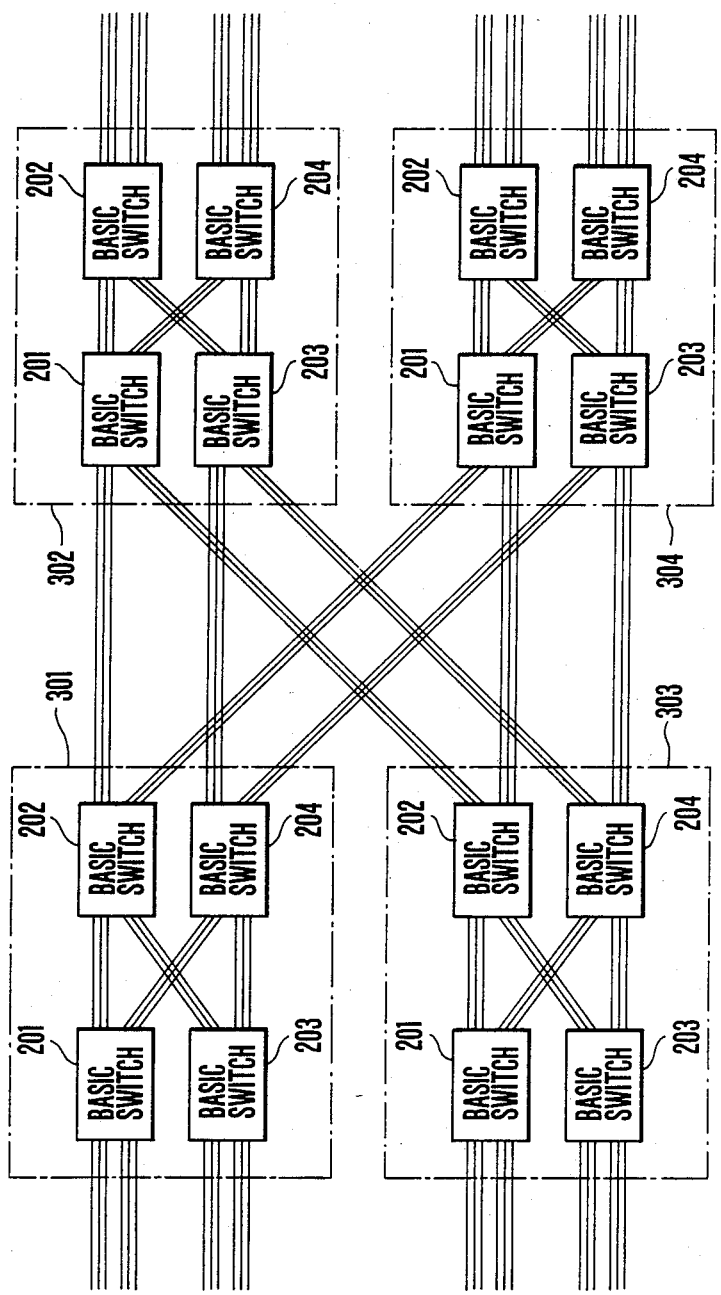
FIG. 5 is a block diagram showing an equivalent circuit of a switching network shown in FIG. 4.

FIG. 5 is a space-division equivalent switching network of the time-division switching network shown in FIG. 4. In the space-division equivalent switching network shown in FIG. 5, a primary switch group consisting of basic switch groups 301 and 303 and a secondary switch group consisting of basic switch groups 302 and 304 are connected by a triple-juncture connection technique.

According to the embodiment of the present invention as described above, a high-speed time-division switching network can be constituted without having to take into considering signal delays due to signal propagation in the wiring. A time-division switching network with a large switching capacity can be constituted without using space switches having a large matrix size.

Figure 6:
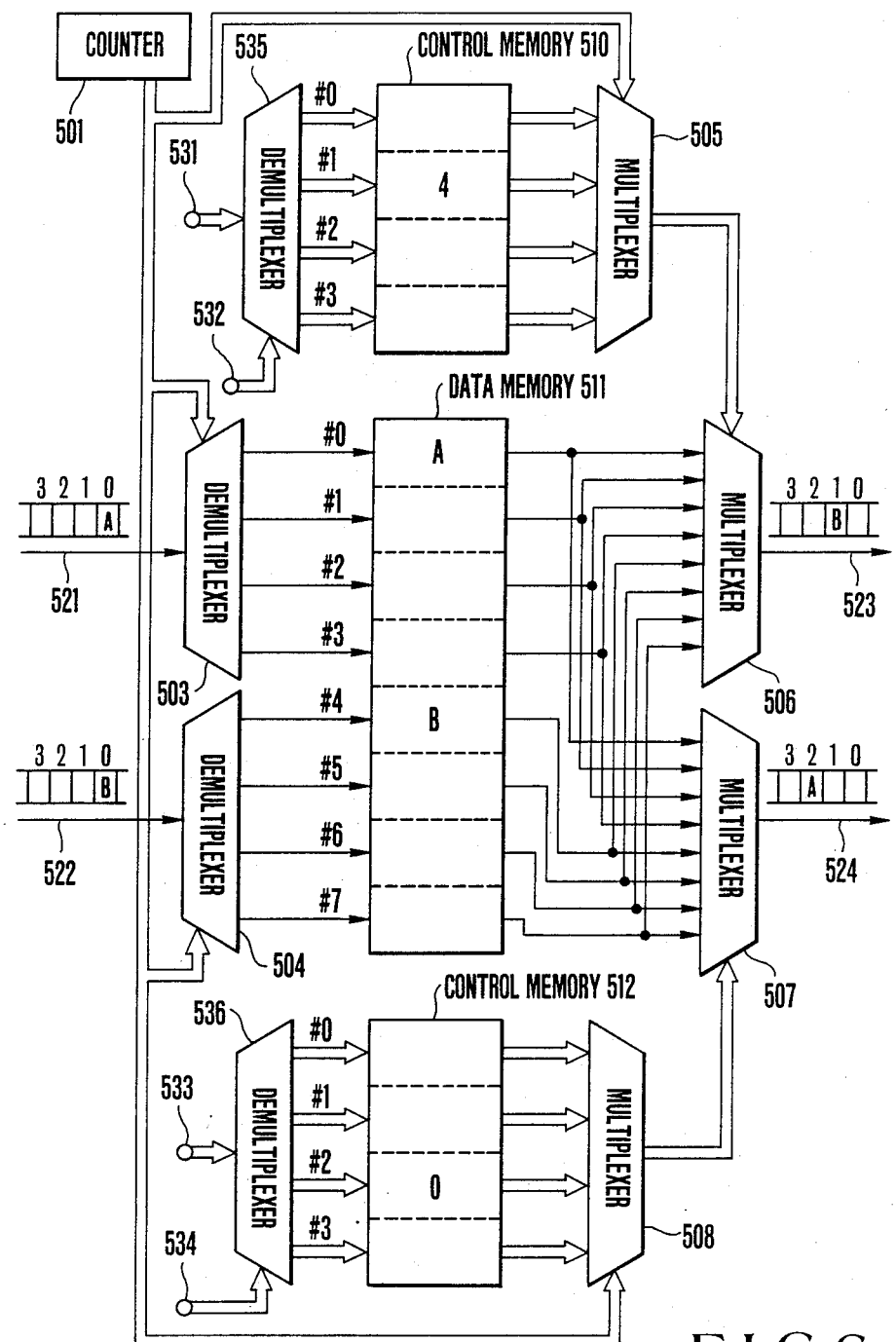
FIG. 6 is a block diagram showing another embodiment of a time switch according to the present invention.

FIG. 6 is a block diagram showing a time switch according to another embodiment of the present invention. The time switch shown in FIG. 6 comprises: a counter 501; a demultiplexer 535 for demultiplexing a control data signal input from an input terminal 531 in accordance with a control signal input from a control terminal 532; a control memory 510 for receiving four outputs #0 to #4 from the demultiplexer 535 and outputting four data; a multiplexer 505 for multiplexing and outputting the four data from the control memory 510 in accordance with the control signal from the counter 501.

The time switch further comprises a demultiplexer 536 for demultiplexing a control data signal input from an input terminal 533 in accordance with a control signal input from a control terminal 534; a control memory 512 for receiving outputs #0 to #4 from the demultiplexer 536 and outputting four data; a multiplexer 508 for multiplexing and outputting the four data from the control memory 512 in accordance with the output from the counter 501.

The time switch further comprises: a demultiplexer 503 for demultiplexing an input signal from an input bus 521 in accordance with the output from the counter 501; a demultiplexer 504 for demultiplexing an input signal from an input bus 522 in accordance with the output from the counter 501; a data memory 511 for receiving the outputs from the demultiplexers 504 and 503 and outputting eight data; a multiplexer 506 for multiplexing the eight data output from the data memory 511 in accordance with the output from the multiplexer 505 and outputting the multiplexed data onto an output bus 523; and a multiplexer 507 for multiplexing the eight data output from the data memory 511 in accordance with the output from the multiplexer 508 and outputting the multiplexed data onto an output bus 524.

The operation of the time switch shown in FIG. 6 will be described below with reference to a case wherein data signals A and B multiplexed in time slots 0 on the input buses 521 and 522 are output at a time slot 2 on the output bus 524 and at a time slot 1 on the output bus 523.

The data signal A multiplexed in the time slot 0 on the input bus 521 is stored at an address #0 of the data memory 511 in accordance with the output from the counter 501. When a control system (not shown) outputs data "0" to the control data input terminal 533 and data "2" to the control terminal 534, the demultiplexer 536 writes data "0" at an address #2 of the control memory 512. When the output from the counter 501 is "2", i.e., when the time slot number on the output bus 524 is "2", the multiplexer 508 outputs data "0" written at the address #2 of the control memory 512. The multiplexer 507 outputs the data signal A written at the address #0 of the data memory 511 onto the output bus 524 in accordance with the data "0" from the multiplexer 508.

Similarly, the data signal B multiplexed in the time slot 0 on the input bus 522 is output to a time slot 1 on the output highway 523.

As described above, in this embodiment, since the demultiplexers 503 and 504 are provided to the input buses 521 and 522, respectively, the data signals on the input buses 521 and 522 are simultaneously written at different addresses of the data memory 511. Since the multiplexers 506 and 507 are provided to the output buses 523 and 524, respectively, the data signals A and B written in the data memory 511 can be read out onto the output buses 524 and 523, respectively. In this manner, the time switch having a switching capacity twice that of the conventional time switch can be constituted by a memory having a memory access speed as that of a conventional time switch.

In this embodiment, the data memory consisting of a plurality of areas assigned to corresponding input buses is used, and sequential write access and random read access are performed. However, a data memory consisting of a plurality of areas assigned to corresponding output buses may be used, so that random write access and sequential read access can be performed to constitute a time switch.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A time-division switching network, comprising:
a plurality of switch groups connected to each other through a plurality of intergroup buses;
each of said switch groups comprising a respective plurality of interconnected basic switches;
each of said plurality of basic switches including a plurality of time switches, a plurality of input buses and a plurality of output buses; each of said plurality of input buses being connected to each of said plurality of output buses by a respective one of said plurality of time switches; and a plurality of circuit means respectively connected to each of said input and output buses for providing frame synchronization data to a time-division multiplexed signal on each of said input and output buses; selected ones of said input and output buses constituting said intergroup buses;
each of said time switches including:
a data memory having a data input which is connected to the input bus and a data output which is connected to the output bus;
data-writing means connected to the input bus for detecting a frame phase in accordance with the frame synchronization data provided to the time-division multiplexed signal on the input bus, for aligning the detected frame phase with a frame phase of first control data, and for writing a data signal from the input bus at an address of said data memory indicated by the first control data; and
data-read-out means connected to the output bus for detecting a frame phase in accordance with the frame synchronization data provided to the time-division multiplexed signal on the output bus, for aligning the detected frame phase with a frame phase of second control data, for reading out the data signal from an address of said data memory indicated by the second control data and for outputting the readout data onto the output bus.

2. A time-division switching network, comprising:
a plurality of basic switches, each said basic switch constituting a stage of said switching network and respectively comprising:
a plurality of input buses each of which is effective for transferring a first time-division multiplexed signal;

a plurality of output buses, each of which is effective for transferring a second time-division multiplexed signal;

a plurality of means for providing frame synchronization data to the time-division multiplexed signal on each of said plurality of input and output buses; and a plurality of time switches; each of said plurality of input buses being connected to each of said plurality of output buses by a respective one of said plurality of time switches; for receiving the first time-division multiplexed signal from a corresponding one of said input buses, and for outputting the second time-division multiplexed signal onto a corresponding one of said output buses;

the output buses of the basic switch at each said stage being suitable for being connected, in one-to-one correspondence, to the input buses of another basic switch which forms a next stage in the switching network, said plurality of input buses of the basic switch at a first stage being connected to a plurality of input means, and said plurality of output buses of the basic switch at a last stage being connected to a plurality of output means;

wherein each of said time switches includes:

a data memory having a write data input terminal which is connected to the input bus and a read data output terminal which is connected to the output bus;

data-writing means connected to the input bus for detecting a frame phase of the input bus in accordance with the frame synchronization signal provided to the time-division multiplexed signal on the input bus, for aligning the detected frame phase with a frame phase of first control data, and for writing a data signal from the input bus at an address of said data memory indicated by the first control data; and data-read-out means connected to the output bus for detecting a frame phase of the output bus in accordance with the frame synchronization signal provided to the time-division multiplexed signal on the output bus, for aligning the detected frame phase with a frame phase of second control data, for reading out the data signal from an address of said data memory indicated by the second control data and for outputting the readout data onto the output bus.

3. A network according to claim 2, wherein said data-writing means comprises a frame synchronization circuit connected to the input bus, for detecting the frame synchronization data of the input bus, and a counter which is connected to an address input of said data memory, which is reset by an output from said frame synchronization circuit, and which supplies a count value as the first control data to said address input of said data memory.

4. A network according to claim 2, wherein said data-read-out means comprises a frame synchronization circuit having an input terminal which is connected to the output bus and is effective for detecting the frame synchronization data of the output bus; a counter which is reset by an output from said frame synchronization circuit to perform counting and which includes an output; and a control memory which is connected to a read address input of said data memory, which prestores the second control data, and which supplies a read address to said read address input of said data memory in accordance with a signal on said output from said counter.

5. A time switch, comprising:

a plurality of input buses;

a plurality of output buses;

a memory consisting of a plurality of areas respectively assigned to said input buses; each area having a memory input and a memory output;

means for producing a first control signal on a first control output;

means for producing respective second control signals on respective second control outputs;

a plurality of write means with respective data inputs respectively connected to the input buses, with outputs respectively connected to memory inputs and with respective control inputs connected to said first control output, for writing in said memory data signals associated with said input buses via said memory inputs in accordance with said first control signal; and a plurality of read means with respective data outputs respectively connected to the output buses, with inputs respectively connected to memory outputs and with respective control inputs respectively connected to said respective second control outputs, for reading out from said memory the data signals via said memory outputs in accordance with said second control signal.

6. A time switch according to claim 5, wherein:

each of said plurality of write means has outputs connected solely to memory inputs assigned to a corresponding input bus so as to be effective for writing the data signal only in areas of said memory assigned to the corresponding input bus; and each of said plurality of read means has inputs connected to all the memory outputs so as to be effective for reading out the data signal from a desired address of any areas of said memory to the output bus.

7. A time switch according to claim 5, wherein:

each of said plurality of write means has inputs connected to all the memory inputs so as to be effective for writing the data signal at a desired address of any areas of said memory; and each of said plurality of read means has inputs connected solely to memory outputs assigned to a corresponding output bus so as to be effective for reading out, to said output bus, only the data signal from areas of said memory assigned to the corresponding output bus.

* * * * *